E. BLANCHARD.
ADJUSTABLE AND DETACHABLE BOW FOR SPECTACLES.
APPLICATION FILED JUNE 14, 1913.
1,084,064.
Patented Jan. 13, 1914.
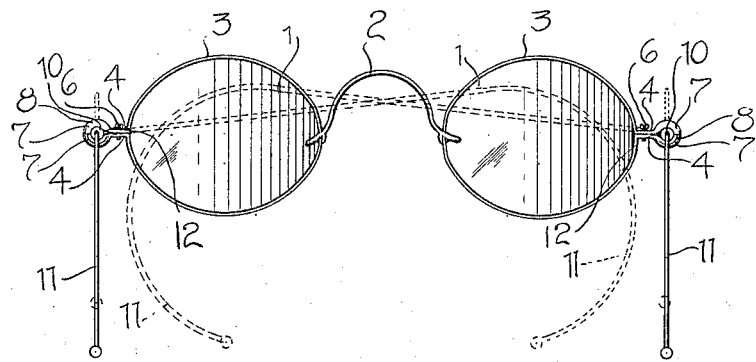
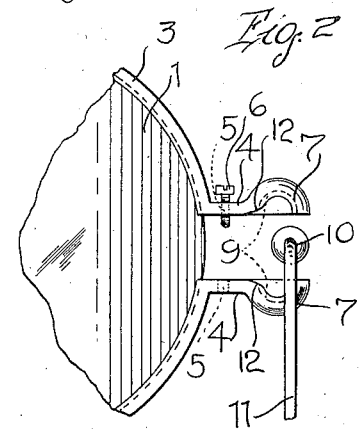
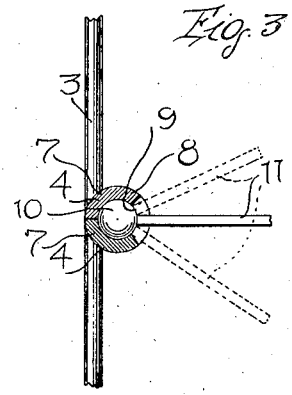
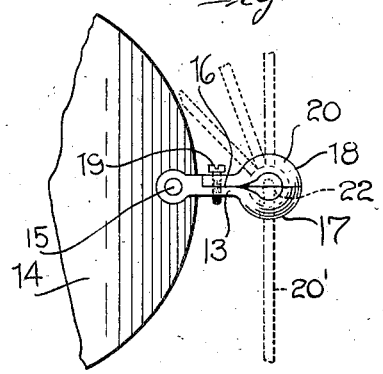
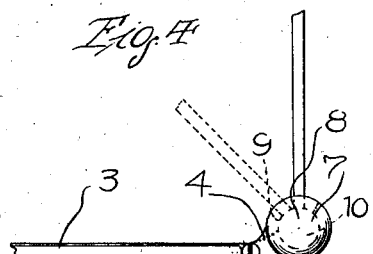
Witnesses
Robert M. Sutphent
A. I. Hind
Inventor
E. Blanchard
By Watson E. Coleman
Attorney

UNITED STATES PATENT OFFICE.

EDWARD BLANCHARD, OF SAN ANGELO, TEXAS.

ADJUSTABLE AND DETACHABLE BOW FOR SPECTACLES.

1,084,064. Specification of Letters Patent. Patented Jan. 13, 1914.

Application filed June 14, 1913. Serial No. 773,729.

*To all whom it may concern:*

Be it known that I, EDWARD BLANCHARD, a citizen of the United States, residing at San Angelo, in the county of Tom Green and State of Texas, have invented certain new and useful Improvements in Adjustable and Detachable Bows for Spectacles, of which the following is a specification, reference being had to the accompanying drawings.

This invention relates to new and useful improvements in the class of optics and more particularly to an improvement in means for applying the temple bows to the glasses and the primary object of the invention resides in providing universal joints for connection between the bows and the lens frame or the lens proper.

A still further object of the invention resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawing forming a part of this application, Figure 1 is a rear elevation of a pair of spectacles constructed in accordance with my invention. Fig. 2 is a fragmentary rear elevation thereof showing the parts separated. Fig. 3 is a section through the socket portion of the same. Fig. 4 is a fragmentary plan view thereof; and Fig. 5 is a fragmentary elevation of the embodiment of a slight modification of my invention.

In describing my invention, I shall refer to the drawing in which similar reference characters designate corresponding parts throughout the several views and in which—

1 indicates a pair of lenses which are held in a frame, consisting of a nose piece 2 and the lens-retaining portions 3. These lens-retaining portions of the frame are substantially oval-shaped and split, the ends of each portion being provided with the lateral ears 4 and said ears are provided with alining threaded openings 5, with which are adapted to be engaged an adjusting screw 6. Each lens-engaging portion is, in itself, a clamp to removably secure the lens therein, the same being held in operative position by means of the screw 6 which is engaged with the openings 5 of the lateral ears at the ends of the substantial clamp.

As stated above, my invention primarily contemplates a means for detachably securing the temple bows to the lens frame and in contemplation thereof, each of the ears 4 is provided with a hemi-spherical socket portion or the like 7. When the frame or clamp portion 3 of each lens is brought into its operative position so that the ears 4 at the ends of this portion are clamped together, the socket portions 7 will be held together to provide a complete outer shell 8. The socket portions 7 are so cut-away as to provide an opening 9 in the shell 8 when said socket portions are brought into clamped position and said shell is adapted to form a complete retaining socket for a ball 10 formed on the inner end of a temple bow 11. The ears 4, at the junctions thereof with the socket portions 7 are also cut-away or beveled, as shown at 12 so that when the complete outer shell is formed, a channel-way or the like is provided which leads to the opening 9 in said shell and from the construction shown and described, it will be seen that a universal joint is provided between the temple bows and the lens frames. As the channel-way and the opening 9 are of reasonable size, the bows may be disposed in various positions so that the nose piece and lenses may be disposed to a position to accommodate the angle of vision of the wearer. The usual twisting of the bows which is required in the use of the ordinary spectacles, wherein the ordinary pivot points are provided between the bows and lens frames, is obviated. Such a joint between the bows and the lens frames permits of a symmetrical adjustment of the frame to the angle of vision without disturbing the lines of the bows and, furthermore, it eliminates the bending of the bows to accommodate them to the wants of the individual, thus greatly increasing the durability thereof.

In Fig. 5, I have shown a slightly modified form of the invention, wherein my improved temple bow connection is applied to rimless lenses. In this form of the device, an ear 13 is secured to a lens 14 by means of a rivet or other similar means, as shown at 15, said ear projecting laterally from the lens. This laterally projecting ear is reduced in thickness or offset, as shown at 16 and the extreme outer end thereof is provided with a socket section 17. A plate-like section 18 is adapted to be applied to the offset portion 16 of the ear 13 to complete the formation of the latter, the same being adapted to be secured in position by means of a screw 19. This plate-like section 18 is also provided with a complementary socket section 20 which, when the plate-like section is applied to the ear, coöperates with the section 17 to form a complete section or shell on the device, as in the other form. A bow 20′, similar to the bow 11 is also provided, the same having a ball 22 on its inner end which is received in the socket or shell formed by the sections 17 and 20, when the same are clamped together. The device is otherwise identical to that shown in the first mentioned form.

From the foregoing description of the construction of my improved device, the operation thereof will be readily understood and it will be seen that I have provided an improved joint between the temple bows and the lens frame and lens proper which is simple and durable in construction, inexpensive to manufacture and one which will be very efficient in use.

While I have particularly described the elements best adapted to perform the functions set forth, it is obvious that various changes in form, proportion and in the minor details of construction may be resorted to without departing from the spirit or sacrificing any of the principles of the invention.

Having thus described this invention, what is claimed is:—

1. In a device of the class described, the combination with a lens, and a socket carried thereon and projecting laterally from the same; of a temple bow having a ball mounted on the inner end thereof and disposed in said socket to afford a universal movement between the bow and the lens.

2. In a device of the class described, the combination with a lens; a socket secured thereto, formed in sections, said sections being adapted to be removably secured together; of a temple bow having a ball formed on the inner end thereof and received between the sections of said socket to afford a universal movement between the bow and said lens.

3. In a device of the class described, the combination with a split frame having laterally extending ears formed at the ends thereof, means to secure said ears together and simultaneously secure the split frame in effective position, and socket sections formed on the outer ends of said ears coöperating with one another to form a substantially spherical shell; of a temple bow having a ball on the inner end thereof clamped between the socket sections of said shell, whereby to provide a universal connection between said bow and the frame.

4. In a device of the class described, the combination with a split frame having laterally extending ears formed on the ends thereof, means to clamp said ears together, and socket sections formed on the outer ends of said ears adapted to coöperate with one another to form a substantially spherical shell, said socket sections being provided with cut-away portions to provide an opening and a lead channel in said shell; of a temple bow having a ball formed on one end thereof and clamped between the socket sections of said shell, whereby to provide a universal connection between said bow and frame.

In testimony whereof I hereunto affix my signature in the presence of two witnesses.

EDWARD BLANCHARD.

Witnesses:
OSCAR FERTSCH,
CALVIN J. WALTERS.